(12) United States Patent
Watanabe

(10) Patent No.: US 12,085,543 B2
(45) Date of Patent: Sep. 10, 2024

(54) CHROMATOGRAPHIC CONTROL DEVICE, CHROMATOGRAPHIC SYSTEM, CHROMATOGRAPHIC CONTROL METHOD, CHROMATOGRAPHIC CONTROL PROGRAM AND NON-TRANSITORY COMPUTER READABLE MEDIUM

(71) Applicant: SHIMADZU CORPORATION, Kyoto (JP)

(72) Inventor: Satoru Watanabe, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 682 days.

(21) Appl. No.: 17/282,764

(22) PCT Filed: Oct. 15, 2018

(86) PCT No.: PCT/JP2018/038323
§ 371 (c)(1),
(2) Date: Apr. 4, 2021

(87) PCT Pub. No.: WO2020/079732
PCT Pub. Date: Apr. 23, 2020

(65) Prior Publication Data
US 2022/0003722 A1    Jan. 6, 2022

(51) Int. Cl.
  *G01N 30/02* (2006.01)
  *G01N 30/32* (2006.01)
  *G01N 30/82* (2006.01)

(52) U.S. Cl.
  CPC ............. *G01N 30/32* (2013.01); *G01N 30/82* (2013.01); *G01N 2030/027* (2013.01); *G01N 2030/324* (2013.01)

(58) Field of Classification Search
  CPC .. G01N 30/32; G01N 30/82; G01N 2030/027; G01N 2030/324; G01N 30/46;
  (Continued)

(56) References Cited

U.S. PATENT DOCUMENTS

2002/0048610 A1  4/2002  Cima
2002/0098518 A1  7/2002  Levinson
(Continued)

FOREIGN PATENT DOCUMENTS

JP      05-052835 A      3/1993
JP    2003-519698 A      6/2003
(Continued)

OTHER PUBLICATIONS

International Search Report for corresponding Application No. PCT/JP2018/038323, mailed Jan. 15, 2019.
(Continued)

*Primary Examiner* — Robert R Raevis
(74) *Attorney, Agent, or Firm* — Renner, Otto, Boisselle & Sklar, LLP

(57) ABSTRACT

In a chromatograph, a mobile phase is supplied to any of a plurality of columns by a mobile phase supplier, and a sample is supplied to the column by a sample supplier. The sample that has passed through the column is detected by a detector. In a chromatographic control device, a flow rate of the mobile phase for the analysis with use of the column is registered by a flow rate registrar in association with column specifying information for specifying each column. The flow rate of the mobile phase registered in association with a selected column is acquired from registered content of the flow rate registrar. The chromatograph is controlled such that the analysis is performed by an analysis controller while the mobile phase is supplied to the selected column with use of the selected column and the flow rate of the mobile phase acquired by a flow rate acquirer.

8 Claims, 7 Drawing Sheets

(58) Field of Classification Search
CPC ........... G01N 30/88; G01N 2030/8804; G01N 30/02; G01N 2030/8809; G01N 2030/02
USPC ........... 73/61.56, 61.52, 61.55, 1.01, 863.01; 210/656; 422/70
See application file for complete search history.

(56) References Cited

U.S. PATENT DOCUMENTS

| | | |
|---|---|---|
| 2002/0177167 A1 | 11/2002 | Levinson |
| 2003/0059837 A1 | 3/2003 | Levinson |
| 2003/0106492 A1 | 6/2003 | Levinson |
| 2003/0123057 A1 | 7/2003 | Lemmo |
| 2003/0138940 A1 | 7/2003 | Lemmo |
| 2003/0162226 A1 | 8/2003 | Cima |
| 2004/0252299 A9 | 12/2004 | Lemmo |
| 2005/0130220 A1 | 6/2005 | Lemmo |
| 2005/0191614 A1 | 9/2005 | Cima |
| 2006/0141533 A1 | 6/2006 | Levinson |
| 2007/0020662 A1 | 1/2007 | Cima |
| 2007/0021929 A1 | 1/2007 | Lemmo |
| 2009/0288473 A1 | 11/2009 | Suzuki |
| 2012/0222470 A1 | 9/2012 | Suzuki |
| 2014/0157878 A1 | 6/2014 | Ohashi |

FOREIGN PATENT DOCUMENTS

| | | |
|---|---|---|
| JP | 2008-224559 A | 9/2008 |
| JP | 2009-008402 A | 1/2009 |
| JP | 2009-281897 A | 12/2009 |
| WO | 2013/011818 A1 | 1/2013 |

OTHER PUBLICATIONS

Written Opinion for corresponding Application No. PCT/JP2018/038323, mailed Jan. 15, 2019 (machine translation).

Office Action in corresponding Chinese Patent Application No. 201880098562.0 dated Jul. 26, 2023, withEnglish machine translation.

Wang Zhicong; "Using Agilent Method Screening Wizard (MSW) software to automatically screen sulfonamides analysis parameters, method adjustment and optimization, method scaling and transfer during method development"; May 1, 2018, https://www.agilent.com/cs/library/applications/5991-9315ZHCN.PDF; with English Machine Translation.

Office Action in corresponding Chinese Patent Application No. 201880098562.0 dated Apr. 12, 2024, with English machine translation.

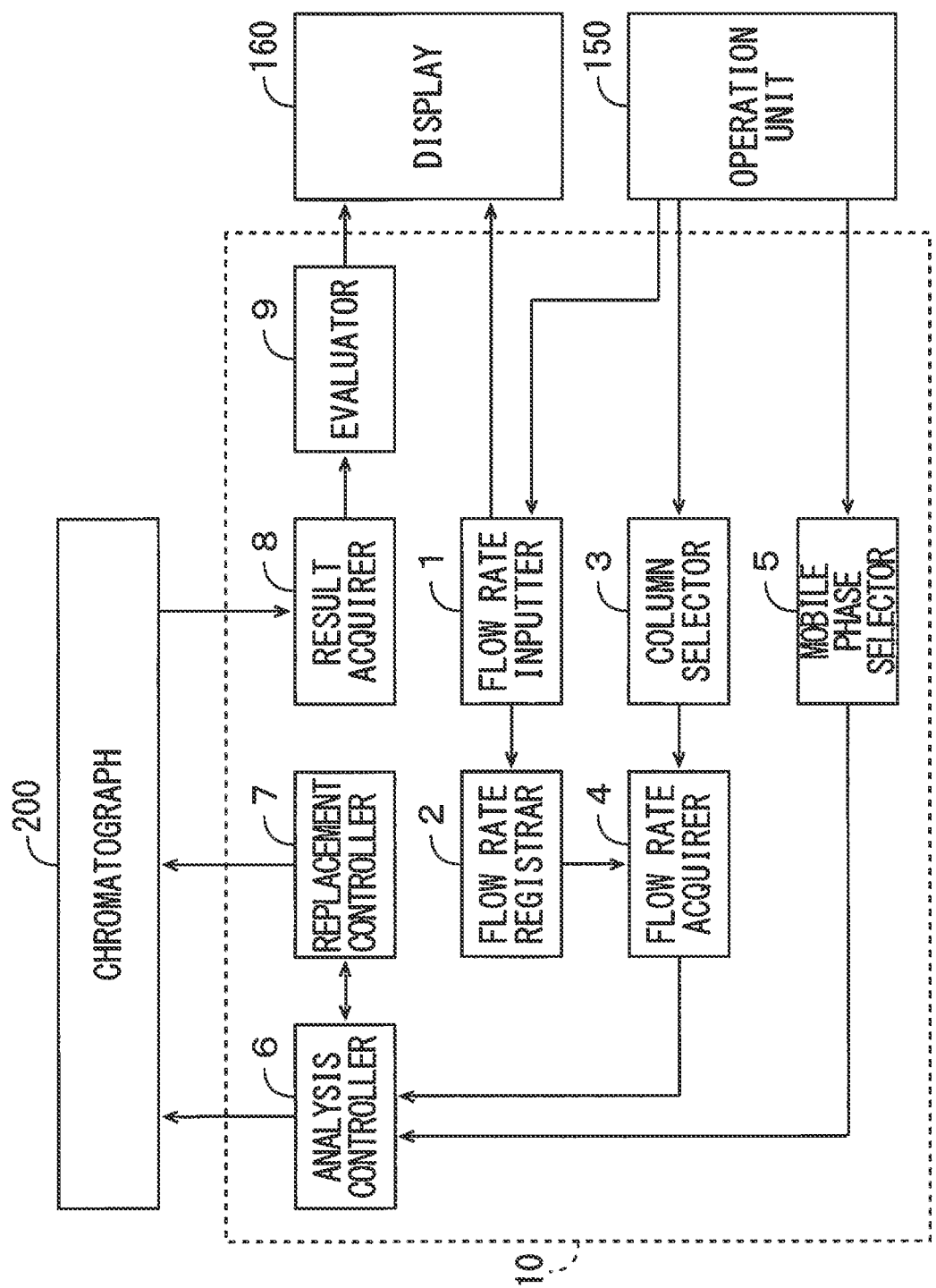
F I G. 3

FIG. 4

INPUT SCREEN

GENERAL INFORMATION

NAME : ********  162
ABBREVIATION : ********  162
IDENTIFICATION INFORMATION : ********  162
COMMENT : ********  162

SPECIFICATION OF COLUMN

BRAND : ********  162
STATIONALY PHASE : ********  162
PRESSURE RESISTANCE (MPa) : ***  163
FLOW RATE (mL/min) : ***

MODE : *****  162
P. Max (MPa) DURING USE : *****  162
UPPER LIMIT TEMPERATURE (°C) : *****  162

PARTICLE DIAMETER (μm) : *****  162
INNER DIAMETER (mm) : *****  162
LENGTH (mm) : *****  162

OK    ADD    CANCEL 160
161

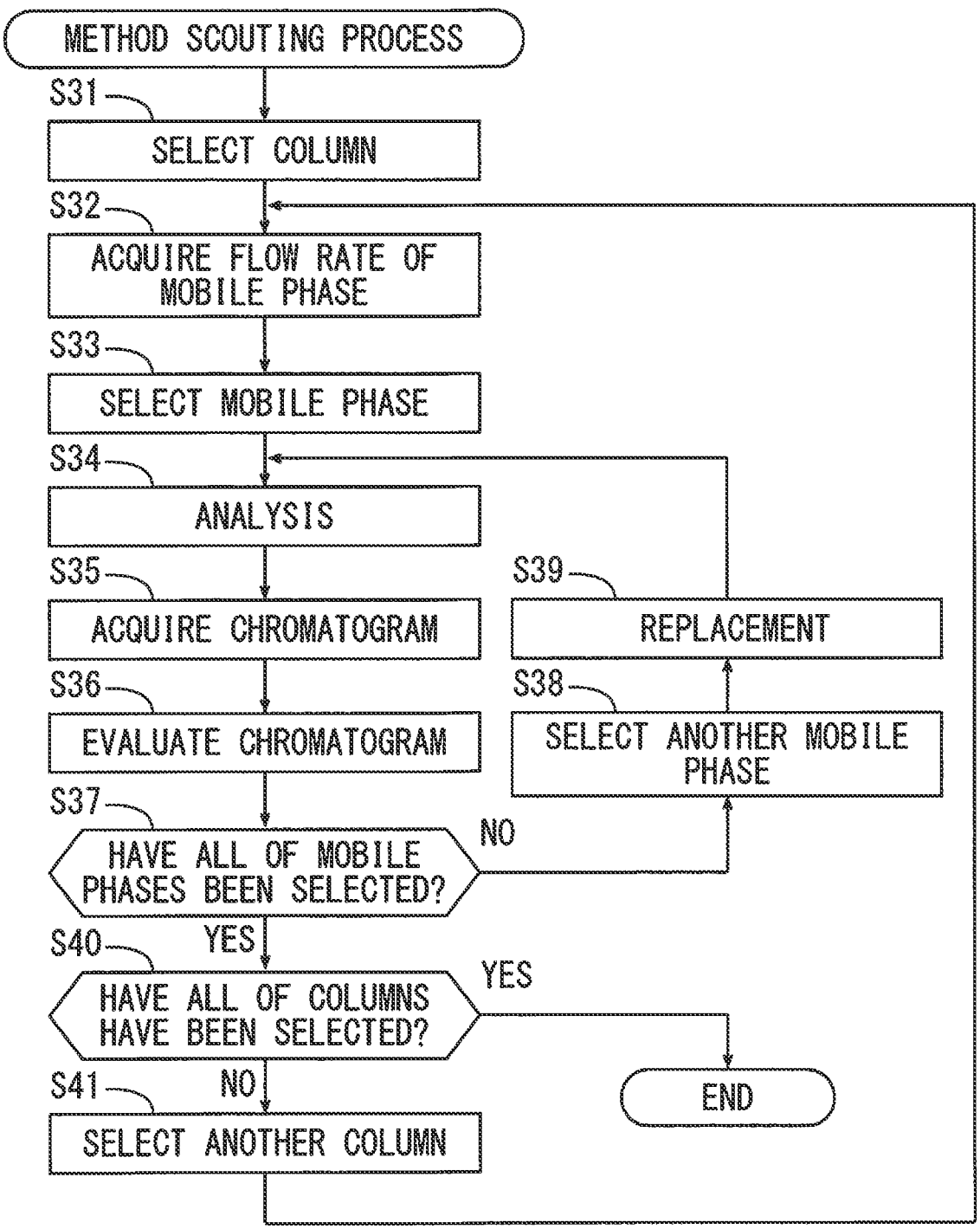

CHROMATOGRAPHIC CONTROL DEVICE, CHROMATOGRAPHIC SYSTEM, CHROMATOGRAPHIC CONTROL METHOD, CHROMATOGRAPHIC CONTROL PROGRAM AND NON-TRANSITORY COMPUTER READABLE MEDIUM

TECHNICAL FIELD

The present invention relates to a chromatographic control device, a chromatographic system, a chromatographic control method and a non-transitory computer readable medium storing a chromatographic control program for controlling a chromatograph.

BACKGROUND ART

Chromatographs have been known as devices that separate substances included in samples into different components. For example, in a liquid chromatograph described in Patent Document 1, a sample to be analyzed is introduced into a separation column (hereinafter simply referred to as a column) by an autosampler. Further, an eluent (mobile phase) is supplied to the column by an eluent pump. The sample that has been introduced into the column is eluted into compounds based on a difference in chemical property or composition and detected by a detector.

[Patent Document 1] JP 2008-224559 A

SUMMARY OF INVENTION

Technical Problem

In a chromatograph, it is necessary to appropriately select each of various analysis conditions such as a column filler, a dimension of column, a temperature of column, a type of mobile phase, a pH of mobile phase and a flow rate of mobile phase. Therefore, a user performs an analysis of a sample in regard to each of combinations of various analysis conditions and searches for an appropriate combination of analysis conditions. However, a column may be damaged by application of a load to the column depending on an analysis condition.

An object of the present invention is to provide a chromatographic control device, a chromatographic system, a chromatographic control method and a non-transitory computer readable medium storing a chromatographic control program that can prevent a column from being damaged.

Solution to Problem (1) A chromatographic control device according to one aspect of the present invention controls a chromatograph that performs an analysis of a sample by using any of a plurality of columns and a mobile phase and includes a flow rate registrar that registers a flow rate of the mobile phase for the analysis with use of each column in association with column specifying information for specifying the column, a column selector that selects the column to be used for the analysis, a flow rate acquirer that acquires the flow rate of the mobile phase registered in association with the column selected by the column selector from registered content of the flow rate registrar, and an analysis controller that controls the chromatograph such that the analysis is performed while the mobile phase is supplied to the selected column with use of the column selected by the column selector and the flow rate of the mobile phase acquired by the flow rate acquirer.

In this chromatographic control device, the flow rate of the mobile phase for the analysis with use of the column is registered in association with the column specifying information for specifying each column of the chromatograph. Further, the column to be used for the analysis is selected. The flow rate of the mobile phase registered in association with the selected column is acquired from the registered content of the flow rate registrar. The chromatograph is controlled such that the analysis is performed while the mobile phase is supplied to the selected column with use of the selected column and the flow rate of the mobile phase acquired by the flow rate acquirer. In this case, the analysis is performed with use of the selected column. The mobile phase is prevented from being supplied to the selected column at an excessive flow rate. Thus, the column can be prevented from being damaged.

(2) The chromatographic control device may further include a flow rate receiver to which the flow rate of the mobile phase corresponding to the column specifying information is input based on an operation performed by a user, wherein the flow rate registrar may register the flow rate of the mobile phase that is received by the flow rate receiver in association with the column specifying information. In this case, the user can input the flow rate of the mobile phase for the analysis with use of the column in association with the column specifying information of each column by operating the flow rate receiver.

(3) The column specifying information may be a name or identification information of the column. In this case, the flow rate of the mobile phase for the analysis with use of the column can be registered easily in association with the name or identification information of the column.

(4) The column specifying information may be a column parameter including at least one of a particle diameter of a column filler, an inner diameter of the column and a length of the column. In this case, the flow rate of the mobile phase for the analysis with use of the column can be registered easily in association with the column parameter.

(5) The chromatographic control device may further include a mobile phase selector that automatically and sequentially selects mobile phases to be used for the analysis and an evaluator, wherein the column selector may be configured to sequentially and automatically select the plurality of columns as columns to be used for the analysis, the analysis controller may control the chromatograph such that the analysis is performed while the mobile phases selected by the mobile phase selector are supplied sequentially to the plurality of columns selected by the column selector at flow rates of the mobile phases acquired by the flow rate acquirer, and the evaluator may evaluate a result of analysis performed by the analysis controller. In this case, a result of analysis corresponding to each column is acquired, and a result of the analysis is evaluated. Thus, the user can easily determine an optimal column for the analysis of the sample.

(6) A chromatographic system according to another aspect of the present invention includes a chromatograph and the above-mentioned chromatographic control device, wherein the chromatograph includes a plurality of columns, a mobile phase supplier that supplies a mobile phase to any column among the plurality of columns, a sample supplier that supplies a sample to the column, and a detector that detects a sample that has passed through the column.

In this chromatographic system, the mobile phase and the sample are supplied to any column among the plurality of columns, and the sample that has passed through the column is detected, by the chromatograph. The chromatograph is controlled by the chromatographic control device such that the analysis is performed with use of the selected column. The mobile phase is prevented from being supplied to the selected column at an excessive flow rate. Thus, the column can be prevented from being damaged.

(7) A chromatographic control method according to yet another aspect of the present invention for controlling a chromatograph that performs an analysis of a sample by using any of a plurality of columns and a mobile phase, includes the steps of registering a flow rate of the mobile phase for the analysis with use of each column in association with column specifying information for specifying the column, selecting the column to be used for the analysis, acquiring the flow rate of the mobile phase registered in association with the selected column from registered content, and controlling the chromatograph such that the analysis is performed while the mobile phase is supplied to the selected column with use of the selected column and the acquired flow rate of the mobile phase.

With this chromatographic control method, the analysis is performed with use of the selected column. The mobile phase is prevented from being supplied to the selected column at an excessive flow rate. Thus, the column can be prevented from being damaged.

A non-transitory computer readable medium storing a chromatographic control program according to yet another aspect of the present invention for controlling a chromatograph that performs an analysis of a sample by using any of a plurality of columns and a mobile phase causes a processing device to execute the processes of registering a flow rate of the mobile phase for the analysis with use of each column in association with column specifying information for specifying the column, selecting the column to be used for the analysis, acquiring the flow rate of the mobile phase registered in association with the selected column from registered content, and controlling the chromatograph such that the analysis is performed while the mobile phase is supplied to the selected column with use of the selected column and the acquired flow rate of the mobile phase.

With this chromatographic control program, the analysis is performed with use of the selected column. The mobile phase is prevented from being supplied to the selected column at an excessive flow rate. Thus, the column can be prevented from being damaged. It is possible to provide the chromatographic control program in the form of being stored in a storage medium.

Advantageous Effects of Invention

With the present invention, a column can be prevented from being damaged.

BRIEF DESCRIPTION OF THE DRAWINGS

FIG. 3 is a diagram showing the configuration of a chromatographic control device.

FIG. 4 is a diagram showing one example of an input screen displayed in a display.

FIG. 7 is a flowchart showing another example of the algorithm of the method scouting process in the chromatographic control process of FIG. 5.

DESCRIPTION OF EMBODIMENTS (1) Configuration of Chromatographic System

Figure 1:
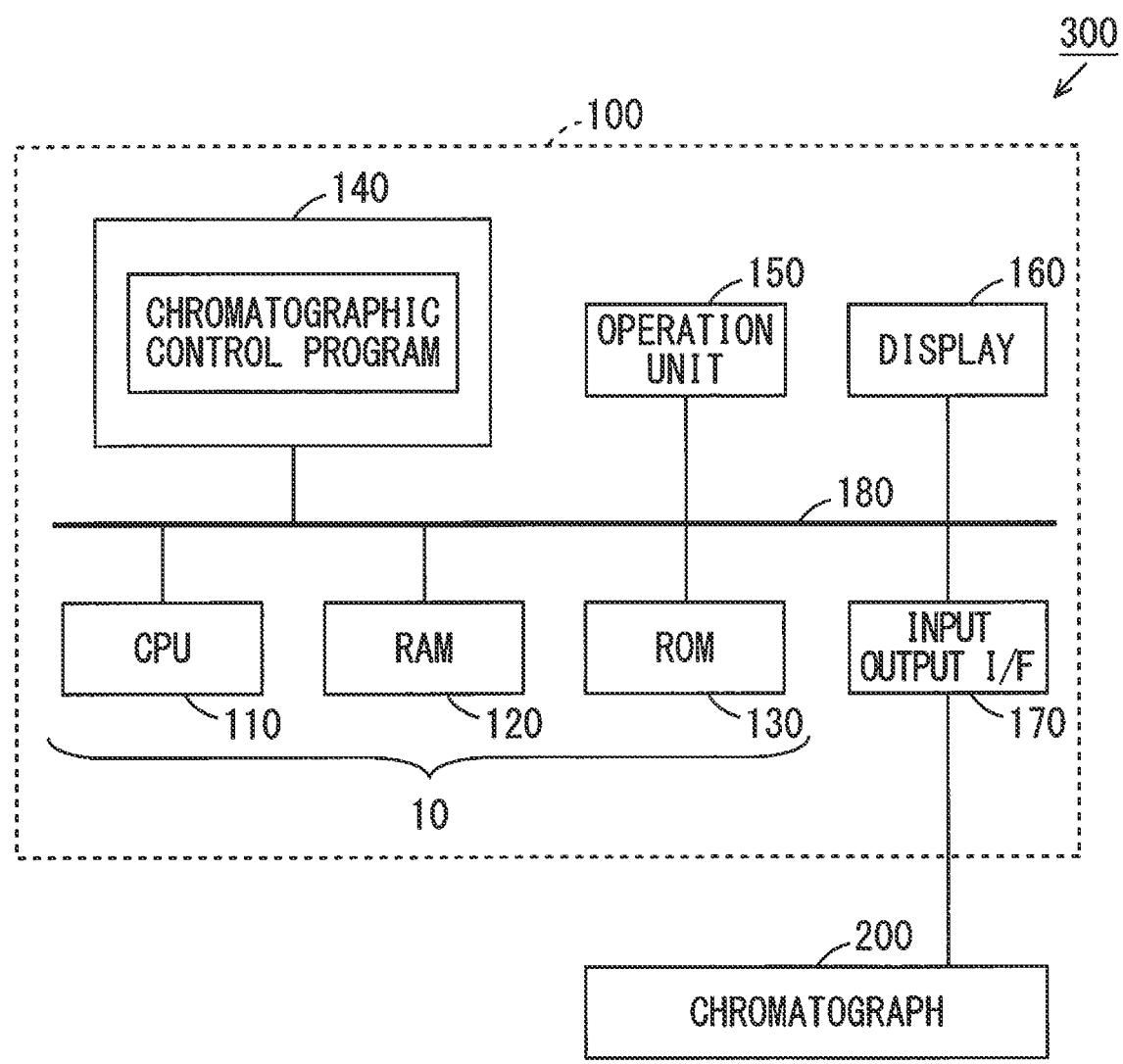
FIG. 1 is a diagram showing the configuration of a chromatographic system according to one embodiment of the present invention.

A chromatographic control device, a chromatographic system, a chromatographic control method and a non-transitory computer readable medium storing a chromatographic control program according to embodiments of the present invention will be described below in detail with reference to the drawings. FIG. 1 is a diagram showing the configuration of the chromatographic system according to one embodiment of the present invention. As shown in FIG. 1, the chromatographic system 300 includes a processing device 100 and a chromatograph 200.

The processing device 100 is constituted by a CPU (Central Processing Unit) 110, a RAM (Random Access Memory) 120, a ROM (Read Only Memory) 130, a storage 140, an operation unit 150, a display 160 and an input output I/F (interface) 170. The CPU 110, the RAM 120, the ROM 130, the storage 140, the operation unit 150, the display 160 and the input output I/F 170 are connected to a bus 180. The CPU 110, the RAM 120 and the ROM 130 constitute a chromatographic control device 10.

The RAM 120 is used as a work area for the CPU 110. A system program is stored in the ROM 130. The storage 140 includes a storage medium such as a hard disc or a semiconductor memory. The chromatographic control program for controlling the chromatograph 200 is stored in the storage 140. The chromatographic control program may be stored in a storage medium different from the storage 140. The CPU 110 executes the chromatographic control program stored in the storage 140 or the like on the RAM 120, whereby a chromatographic control process, described below, is executed.

The operation unit 150 is an input device such as a keyboard, a mouse or a touch panel. The display 160 is a display device such as a liquid crystal display device and displays an execution screen for the chromatographic control process to be executed by the chromatographic control device 10, and so on. The input output I/F 170 is connected to the chromatograph 200.

Figure 2:
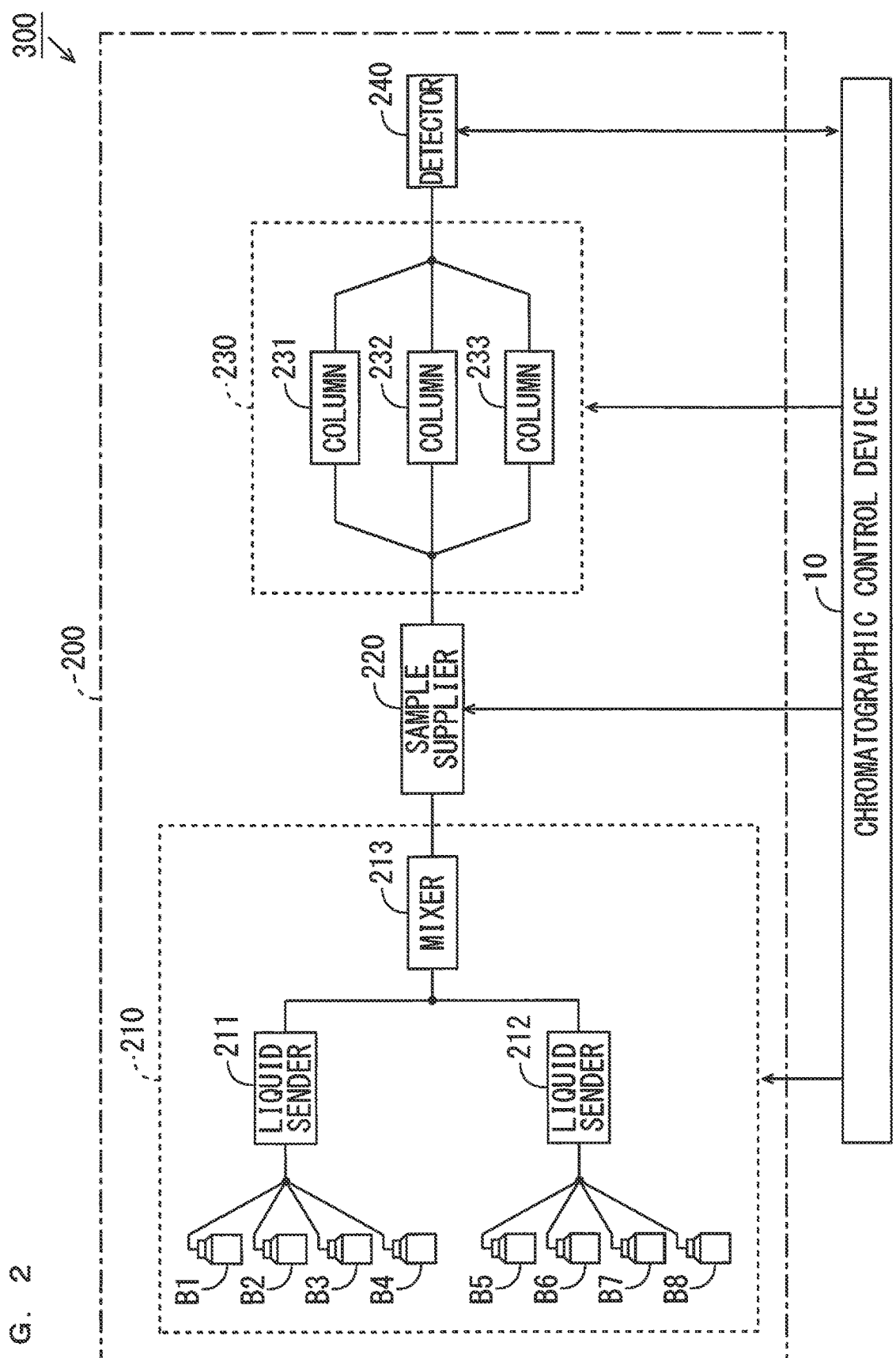
FIG. 2 is a schematic diagram showing the configuration of a chromatograph.

FIG. 2 is a schematic diagram showing the configuration of the chromatograph 200. As shown in FIG. 2, in the present embodiment, the chromatograph 200 is a liquid chromatograph and includes a mobile phase supplier 210, a sample supplier 220, a column oven 230 and a detector 240.

The mobile phase supplier 210 includes two liquid senders 211, 212 and a mixer 213. Further, a plurality (eight in the example of FIG. 2) of chemical bottles B1 to B8 are provided in the mobile phase supplier 210. In the chemical bottles B1 to B4, respectively different aqueous solutions are contained as chemical liquids. In the chemical bottles B5 to B8, respectively different organic solvents are contained as chemical liquids.

The liquid senders 211, 212 are liquid sending pumps, for example. The liquid sender 211 pumps a chemical liquid contained in any one or more chemical bottles selected by a switch valve (not shown) from among the chemical bottles B1 to B4. The liquid sender 212 pumps a chemical liquid contained in any one or more chemical bottles selected by a switch valve (not shown) from among the chemical bottles B5 to B8. A degassing device (not shown) is provided between the liquid sender 211 and the chemical bottles B1 to B4, and a degassing device (not shown) is provided between the liquid sender 212 and the chemical bottles B5 to B8.

The mixer 213 is a gradient mixer, for example. The mixer 213 generates various mobile phases by mixing a chemical liquid pumped by the liquid sender 211 with a chemical liquid pumped by the liquid sender 212 at any ratio, thereby supplying the generated mobile phases. The sample supplier 220 is an injector, for example. The sample supplier 220 selectively introduces a sample to be analyzed together with a mobile phase supplied by the mobile phase supplier 210 to any column selected by a switch valve (not shown) from among columns 231 to 233, described below.

The temperature in the column oven 230 is adjusted to a predetermined constant temperature. The column oven 230 houses the plurality (three in the present example) of columns 231, 232, 233. Each of the columns 231 to 233 separates an introduced sample into components based on differences in chemical property or composition. The detector 240 detects components into which the sample is separated by each of the columns 231 to 233.

The chromatographic control device 10 controls the chromatograph 200 such that an analysis of a sample is performed while the combinations of the columns 231 to 233 and a mobile phase are changed. Thus, the combination of analysis conditions for appropriately analyzing a desired sample can be searched. Such search for a combination of analysis conditions is referred to as method scouting. The configuration of the chromatographic control device 10 will be described below.

(2) Configuration of Chromatographic Control Device

FIG. 3 is a diagram showing the configuration of the chromatographic control device 10. As shown in FIG. 3, the chromatographic control device 10 includes a flow rate receiver 1, a flow rate registrar 2, a column selector 3, a flow rate acquirer 4, a mobile phase selector 5, an analysis controller 6, a replacement controller 7, a result acquirer 8 and an evaluator 9 as functions. The CPU 110 of FIG. 1 executes the chromatographic control program stored in the storage 140 or the like, whereby the functions of the chromatographic control device 10 are implemented. Part or all of the functions of the chromatographic control device 10 may be implemented by hardware such as an electronic circuit.

The flow rate receiver 1 causes the display 160 to display an input screen in which the flow rate of a mobile phase for an analysis with use of the column is to be input in association with column specifying information. Further, the flow rate of the mobile phase corresponding to the column specifying information is input to the flow rate receiver 1 from the operation unit 150. The column specifying information is the information for specifying the columns 231 to 233 of FIG. 2 and includes at least one of a name, identification information, a brand, a stationary phase, pressure resistance and a column parameter, for example. Further, the column parameter includes at least one of the particle diameter of a column filler, the inner diameter of column and the length of column.

FIG. 4 is a diagram showing one example of an input screen displayed in the display 160. As shown in FIG. 4, the input screen 161 includes a plurality of information input portions 162 and an information input portion 163. Each of the information input portions 162, 163 is a field in which a character string is to be input or a pull-down menu. A user can input column specifying information in regard to each of the columns 231 to 233 by performing an operation in regard to any information input portion 162 by using the operation unit 150. Further, the user can input the flow rate of a mobile phase in association with the column specifying information by performing an operation in regard to the information input portion 163 by using the operation unit 150. A value that is equal to or smaller than an upper limit value of the flow rate at which a mobile phase can flow into a column without damaging a column specified by the column specifying information is input as the flow rate of the mobile phase.

The flow rate registrar 2 registers the flow rate of the mobile phase received by the flow rate receiver 1 in association with the column specifying information in a database as the flow rate of the mobile phase for an analysis with use of the column. The column selector 3 selects any one of the columns 231 to 233 based on an instruction provided by the operation unit 150. The user can designate a desired column from among the columns 231 to 233 by operating the operation unit 150. Further, the column selector 3 automatically and sequentially selects the plurality of columns 231 to 233 as columns to be used for an analysis during a method scouting process, described below.

The flow rate acquirer 4 acquires the flow rate of the mobile phase registered in association with the column selected by the column selector 3 from the registered content (database) of the flow rate registrar 2. The mobile phase selector 5 selects a mobile phase to be used for an analysis based on an instruction provided by the operation unit 150. The user can designate any liquid that can be generated by mixing a chemical liquid contained in any of the chemical bottles B1 to B4 and a chemical liquid contained in any of the chemical bottles B5 to B8 as a mobile phase to be used for an analysis by operating the operation unit 150. Further, the mobile phase selector 5 automatically and sequentially selects a plurality of mobile phases as mobile phases to be used for an analysis during the method scouting process, described below.

The analysis controller 6 controls the chromatograph 200 such that an analysis of a sample is performed with use of a column selected by the column selector 3, a flow rate of a mobile phase acquired by the flow rate acquirer 4 and a mobile phase selected by the mobile phase selector 5. Specifically, the chromatograph 200 is controlled such that an analysis is performed while a selected mobile phase is supplied to a selected column at an acquired flow rate.

Immediately after a mobile phase to be used for an analysis is changed by the analysis controller 6, the mobile phase before the mobile phase is changed remains in a flow path of the chromatograph 200 including the columns 231 to 233. Therefore, in a case where a next analysis is performed immediately after the mobile phase is changed, a result of accurate analysis in regard to the mobile phase cannot be obtained. As such, in a case where a mobile phase to be used for an analysis is changed, the replacement controller 7 controls the chromatograph 200 such that the mobile phase before the mobile phase is changed remaining in a flow path is replaced with a mobile phase after the mobile phase is changed. A next analysis in regard to the mobile phase after the mobile phase is changed by the analysis controller 6 is performed after the replacement controller 7 behaves.

The result acquirer 8 acquires a result of detection of components of a sample by the chromatograph 200, and generates a chromatogram representing the relationship between the retention period of time of each component and the detection intensity by processing the acquired result of detection. The evaluator 9 evaluates the quality of a chromatogram based on the separation of the components represented by the chromatogram generated by the result acquirer 8. Further, the evaluator 9 causes the display 160 to display a result of evaluation of a chromatogram and a combination of analysis conditions for generation of the chromatogram in association with each other.

The user can identify an optimal combination of analysis conditions by viewing a result of evaluation displayed in the display 160. In the display 160, results of evaluation of all of the generated chromatograms may be displayed, results of evaluation of chromatograms having a certain degree of quality or higher may be displayed or only a result of evaluation of a chromatogram having the highest degree of quality may be displayed. In a case where the results of evaluation of all of the chromatograms are displayed, the results of evaluation may be displayed such that the results of evaluation of chromatograms having a certain degree of quality or higher can be identified, or may be displayed in a descending order of the degree of quality.

(3) Chromatographic Control Process

Figure 5:
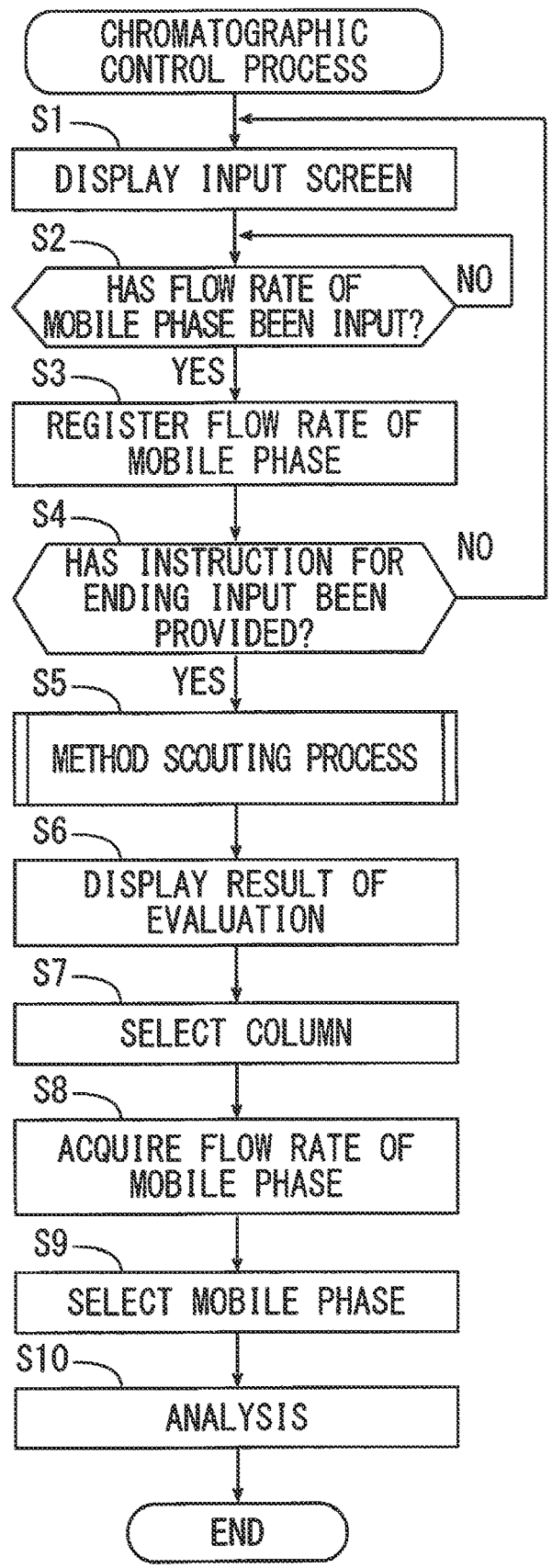
FIG. 5 is a flowchart showing the algorithm of a chromatographic control process executed by a chromatographic control program.

FIG. 5 is a flowchart showing the algorithm of the chromatographic control process executed by the chromatographic control program. First, the flow rate receiver 1 causes the display 160 to display the input screen 161 (step S1) and determines whether a flow rate of a mobile phase has been input (step S2). The user can input a flow rate of a mobile phase in association with any column specifying information by operating the operation unit 150 in the input screen 161.

In a case where a flow rate of a mobile phase is not input, the flow rate receiver 1 waits until a flow rate of a mobile phase is input. In a case where a flow rate of a mobile phase is input, the flow rate registrar 2 registers the flow rate of the mobile phase for an analysis with use of a column in association with column specifying information (step S3).

Next, the flow rate receiver 1 determines whether an instruction for ending input has been provided (step S4). The user can provide an instruction for ending input by operating the operation unit 150. In a case where an instruction for ending input is not provided, the flow rate receiver 1 returns to the step S1. The steps S1 to S3 are repeated until the user inputs the flow rates of the mobile phases corresponding to all of the column specifying information and provides an instruction for ending input.

Figure 6:
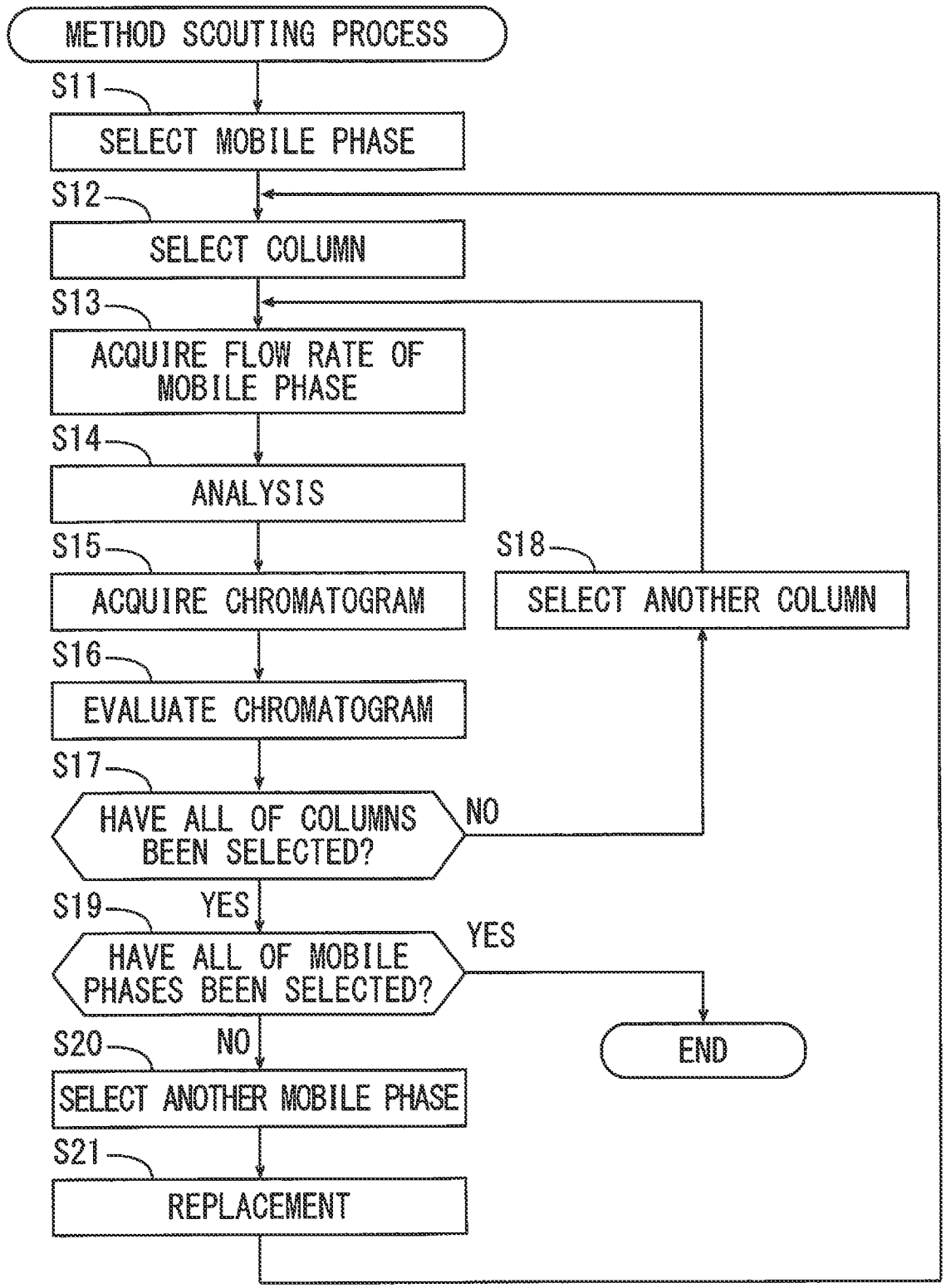
FIG. 6 is a flowchart showing one example of the algorithm of a method scouting process in the chromatographic control process of FIG. 5.

In a case where an instruction for ending input has been provided, a method scouting process of FIG. 6 or 7, described below, is executed (step S5). The user can select which method scouting process between the method scouting processes of FIGS. 6 and 7 is to be executed by operating the operation unit 150. The method scouting process is a process of performing an analysis of a sample while changing combinations of any of the columns 231 to 233 and a mobile phase and evaluating a chromatogram in regard to each combination. After the method scouting process of the step S5 is executed, the evaluator 9 causes the display 160 to display a result of evaluation in the method scouting process (step S6).

Thereafter, the column selector 3 selects any column from among the columns 231 to 233 based on an instruction provided by the operation unit 150 (step S7). The user can identify an optimal column by viewing the result displayed in the display 160 and can designate the column by operating the operation unit 150. The flow rate acquirer 4 acquires the flow rate of the mobile phase registered in the step S3 in association with the column specifying information of the column selected in the step S7 from the database (step S8).

Further, the mobile phase selector 5 selects any mobile phase from among a plurality of mobile phases based on an instruction provided by the operation unit 150 (step S9). The user can identify an optimal mobile phase by viewing the result displayed in the display 160 and can designate the mobile phase by operating the operation unit 150. The steps S7 and S8 may be executed before the step S9 or the step S9 may be executed before the steps S7 and S8.

Subsequently, the analysis controller 6 controls the chromatograph 200 such that an analysis of a sample to be analyzed is performed (step S10). In the analysis, the mobile phase selected in the step S9 is supplied at the flow rate acquired in the step S8 to the column selected in the step S7. Thereafter, the analysis controller 6 ends the chromatographic control process.

FIG. 6 is a flowchart showing one example of the algorithm of the method scouting process in the chromatographic control process of FIG. 5. In the method scouting process of FIG. 6, the mobile phase selector 5 first selects a mobile phase to be used for an analysis (step S11). The mobile phase to be used for the analysis is any liquid that can be generated by mixing a chemical liquid contained in any of the chemical bottles B1 to B4 with a chemical liquid contained in any of the chemical bottles B5 to B8. Further, the column selector 3 selects a column to be used for the analysis (step S12). The column used for the analysis is any of the columns 231 to 233.

Next, the flow rate acquirer 4 acquires the flow rate of the mobile phase registered in the step S3 in association with the column specifying information of the column selected in the step S12 or the below-mentioned step S18 from the database (step S13). Thereafter, the analysis controller 6 controls the chromatograph 200 such that an analysis of a sample to be analyzed is performed (step S14). In the analysis, the mobile phase selected in the step S11 is supplied to the column selected in the step S12 or the step S18 at the flow rate acquired in the step S13.

The result acquirer 8 acquires a result of detection of components of the sample by the chromatograph 200 in the step S14 and processes the acquired result of detection, thereby acquiring a chromatogram (step S15). The evaluator 9 evaluates the quality of the chromatogram acquired in the step S15 (step S16).

Subsequently, the column selector 3 determines whether all of the columns 231 to 233 have been selected (step S17). In a case where all of the columns 231 to 233 have not been selected, the column selector 3 selects another column as a column to be used for an analysis (step S18) and returns to the step S13. The steps S13 to S18 are repeated until all of the columns 231 to 233 are selected.

In a case where all of the columns 231 to 233 have been selected in the step S17, the mobile phase selector 5 determines whether all of the mobile phases have been selected (step S19). In a case where all of the mobile phases have not been selected, the mobile phase selector 5 selects another mobile phase as a mobile phase to be used for an analysis (step S20). In this case, a mobile phase to be used for an analysis is changed.

Here, the replacement controller 7 controls the chromatograph 200 such that the mobile phase before the mobile phase is changed remaining in the flow path of the chromatograph 200 is replaced with the mobile phase after the mobile phase is changed (step S21). The mobile phase is replaced by supply of the mobile phase after the mobile phase is changed for a predetermined period of time or supply of a predetermined volume of the mobile phase after the mobile phase is changed. In this case, the flow rate at which the mobile phase is supplied to each column is the flow rate acquired in the step S13. Thereafter, the replacement controller 7 returns to the step S12. The steps S12 to S21 are repeated until all of the mobile phases are selected. In a case where all of the mobile phases have been selected in the step S19, the mobile phase selector 5 ends the method scouting process.

FIG. 7 is a flowchart showing another example of the algorithm of the method scouting process in the chromatographic control process of FIG. 5. In the method scouting process of FIG. 7, the column selector 3 first selects a column to be used for an analysis (step S31). Similarly to the method scouting process of FIG. 6, the column to be used for the analysis is any of the columns 231 to 233. The flow rate acquirer 4 acquires the flow rate of the mobile phase registered in the step S3 in association with the column specifying information of the column selected in the step S31 or the below-mentioned step S41 from the database (step S32).

Further, the mobile phase selector 5 selects a mobile phase to be used for the analysis (step S33). Similarly to the method scouting process of FIG. 6, the mobile phase to be used for the analysis is any liquid that can be generated by mixing of a chemical liquid contained in any of the chemical bottles B1 to B4 and a chemical liquid contained in any of the chemical bottles B5 to B8.

Next, the analysis controller 6 controls the chromatograph 200 such that an analysis of a sample to be analyzed is performed (step S34). In the analysis, the mobile phase selected in the step S33 is supplied to the column selected in the step S31 or the step S41 at the flow rate acquired in the step S32. The result acquirer 8 acquires a result of detection of components of the sample by the chromatograph 200 in the step S34 and acquires a chromatogram by processing the acquired result of detection (step S35). The evaluator 9 evaluates the quality of the chromatogram acquired in the step S35 (step S36).

Subsequently, the mobile phase selector 5 determines whether all of the mobile phases have been selected (step S37). In a case where all of the mobile phase have not been selected, the mobile phase selector 5 selects another mobile phase as a mobile phase to be used for the analysis (step S38). In this case, the mobile phase to be used for the analysis is changed. Here, the replacement controller 7 controls the chromatograph 200 such that the mobile phase before the mobile phase is changed remaining in the flow path of the chromatograph 200 is replaced with the mobile phase after the mobile phase is changed (step S39) and returns to the step S34. The steps S34 to S39 are repeated until all of the mobile phases are selected.

In a case where all of the mobile phases are selected in the step S37, the column selector 3 determines whether all of the columns 231 to 233 have been selected (step S40). In a case where all of the columns 231 to 233 have not been selected, the column selector 3 selects another column as a column to be used for the analysis (step S41) and returns to the step S32. The steps S32 to S41 are repeated until all of the columns 231 to 233 are selected. In a case where all of the columns 231 to 233 have been selected, the column selector 3 ends the method scouting process.

(4) Effects

The chromatographic system 300 according to the present embodiment includes the chromatographic control device 10 and the chromatograph 200. In the chromatograph 200, a mobile phase is supplied to any of the columns 231 to 233 by the mobile phase supplier 210, and a sample is supplied to the same column 231 to 233 by the sample supplier 220. The sample that has passed through the column 231 to 233 is detected by the detector 240.

In the chromatographic control device 10, the flow rate of the mobile phase for an analysis with use of the columns 231 to 233 is registered in the database by the flow rate registrar 2 in association with the column specifying information for specifying each of the columns 231 to 233. Further, a column to be used for the analysis is selected by the column selector 3. The flow rate of the mobile phase registered in association with the selected column is acquired from the database by the flow rate acquirer 4. The chromatograph 200 is controlled by the analysis controller 6 such that an analysis is performed while a mobile phase is supplied to the selected column with use of the column selected by the column selector 3 at the flow rate of the mobile phase acquired by the flow rate acquirer 4.

In this case, an analysis is performed with use of the selected column. The mobile phase is prevented from being supplied to the selected column at an excessive flow rate. Thus, the columns 231 to 233 can be prevented from being damaged.

Further, at least one information among the name of column, the identification information, the particle diameter of column filler, the inner diameter of column, the length of column and so on can be used as the column specifying information for specifying each column. Thus, the flow rate of the mobile phase for an analysis with use of the column can be registered easily.

(5) Other Embodiments (a) While the chromatographic control device 10 includes the evaluator 9 in the above-mentioned embodiment, the present invention is not limited to this. In a case where the user determines the quality of a chromatogram by viewing the chromatogram, the chromatographic control device 10 does not have to include an evaluator 9. In this case, the step S6 of FIG. 5, the step S16 of FIG. 6 and the step S36 of FIG. 7 are not executed.

(b) While the chromatograph 200 is a liquid chromatograph in the above-mentioned embodiment, the present invention is not limited to this. The chromatograph 200 may be another chromatograph such as a supercritical chromatograph.

The invention claimed is:

1. A liquid chromatographic control device that controls a liquid chromatograph that performs an analysis of a sample by using any of a plurality of columns and a mobile phase; comprising:
   a computer processor configured to:
      register a flow rate of the mobile phase for the analysis with use of each column in association with column specifying information for specifying the column, the flow rate being a value equal to or smaller than an upper limit value of the flow rate at which the mobile phase can flow into the column without damaging the column specified by the column specifying information;
select the column to be used for the analysis from among the plurality of columns included in the liquid chromatograph;
acquire the flow rate of the mobile phase registered in association with the selected column from registered content; and
control the liquid chromatograph such that the analysis is performed while the mobile phase is supplied to the selected column with use of the selected column and the acquired flow rate.

2. The liquid chromatographic control device according to claim 1, wherein the flow rate of the mobile phase corresponding to the column specifying information is input to the computer processor based on an operation performed by a user, and
the computer processor is configured to register the input flow rate of the mobile phase in association with the column specifying information.

3. The liquid chromatographic control device according to claim 2, wherein:
the computer processor is configured to automatically and sequentially select mobile phases to be used for the analysis,
sequentially and automatically select the plurality of columns as columns to be used for the analysis,
control the liquid chromatograph such that the analysis is performed while the selected mobile phases are supplied sequentially to the selected plurality of columns at the acquired flow rates of the mobile phases, and
evaluate a result of the performed analysis.

4. The liquid chromatographic control device according to claim 1, wherein
the column specifying information is a name or identification information of the column.

5. The liquid chromatographic control device according to claim 1, wherein
the column specifying information is a column parameter including at least one of a particle diameter of a column filler, an inner diameter of the column and a length of the column.

6. A liquid chromatographic system comprising:
a liquid chromatograph; and
the liquid chromatographic control device according to claim 1, wherein
the liquid chromatograph includes
a plurality of columns;
a mobile phase supplier that supplies a mobile phase to any column among the plurality of columns;
a sample supplier that supplies a sample to the any column supplied with the mobile phase; and
a detector that detects the supplied sample that has passed through the any column supplied with the mobile phase.

7. A liquid chromatographic control method for controlling a liquid chromatograph that performs an analysis of a sample by using any of a plurality of columns and a mobile phase, including:
registering a flow rate of the mobile phase for the analysis with use of each column in association with column specifying information for specifying the column, the flow rate being a value equal to or smaller than an upper limit value of the flow rate at which the mobile phase can flow into the column without damaging the column specified by the column specifying information;
selecting the column to be used for the analysis from among the plurality of columns included in the liquid chromatograph; acquiring the flow rate of the mobile phase registered in association with the selected column from registered content; and
controlling the liquid chromatograph such that the analysis is performed while the mobile phase is supplied to the selected column with use of the selected column and the acquired flow rate of the mobile phase.

8. A non-transitory computer readable medium storing a liquid chromatographic control program for controlling a liquid chromatograph that performs an analysis of a sample by using any of a plurality of columns and a mobile phase,
the liquid chromatographic control program causing a computer processor to:
register a flow rate of the mobile phase for the analysis with use of each column in association with column specifying information for specifying the column, the flow rate being a value equal to or smaller than an upper limit value of the flow rate at which the mobile phase can flow into the column without damaging the column specified by the column specifying information;
select the column to be used for the analysis from among the plurality of columns included in the liquid chromatograph;
acquire the flow rate of the mobile phase registered in association with the selected column from registered content; and
control the liquid chromatograph such that the analysis is performed while the mobile phase is supplied to the selected column with use of the selected column and the acquired flow rate of the mobile phase.

* * * * *